United States Patent
Brown et al.

(10) Patent No.: US 10,336,650 B2
(45) Date of Patent: Jul. 2, 2019

(54) ANTI-SOILING COMPOSITIONS FOR DRY AND WET SOIL

(71) Applicant: 3M INNOVATIVE PROPERTIES COMPANY, Saint Paul, MN (US)

(72) Inventors: Katherine A. Brown, Lake Elmo, MN (US); Timothy N. Narum, Lake Elmo, MN (US); Jeremy O. Swanson, Woodbury, MN (US); Zachary Malmberg, Coon Rapids, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/114,818

(22) PCT Filed: Feb. 3, 2015

(86) PCT No.: PCT/US2015/014161
§ 371 (c)(1),
(2) Date: Jul. 27, 2016

(87) PCT Pub. No.: WO2015/119905
PCT Pub. Date: Aug. 13, 2015

(65) Prior Publication Data
US 2016/0347653 A1    Dec. 1, 2016

Related U.S. Application Data (60) Provisional application No. 61/935,579, filed on Feb. 4, 2014.

(51) Int. Cl.
C03C 17/00    (2006.01)
C09D 7/61    (2018.01)
(Continued)

(52) U.S. Cl.
CPC .............. C03C 17/007 (2013.01); C09D 1/00 (2013.01); C09D 5/00 (2013.01); C09D 5/1681 (2013.01);
(Continued)

(58) Field of Classification Search
CPC ............. C03C 17/007; C03C 2218/111; C03C 2217/75; C03C 2217/478;
(Continued)

(56) References Cited

U.S. PATENT DOCUMENTS

| | | | |
|---|---|---|---|
| 2004/0068035 A1* | 4/2004 | Paiva | C09D 5/028 524/431 |
| 2006/0147674 A1 | 7/2006 | Walker, Jr. | |

(Continued)

FOREIGN PATENT DOCUMENTS

| | | |
|---|---|---|
| WO | WO 2007-068760 | 6/2007 |
| WO | WO 2009-140482 | 11/2009 |

(Continued)

OTHER PUBLICATIONS

F. de Buyl, Date Unknown, Chapter 19. Organo—Functional Silanes, Dow Corning Europe SA, Seneffe (Belgium), "Silicones in Industrial Applications" in Inorganic Polymers, Nova Science Publishers (www.novapublishers.com).*

(Continued)

*Primary Examiner* — Nathan L Van Sell
(74) *Attorney, Agent, or Firm* — Jeffrey M. Olofson (57) ABSTRACT

A coating composition is provided comprising nanoparticles and certain silane compounds. When applied to articles, particularly glass articles, the coating that is formed is resistant to soiling by both dry dust and wet soil.

15 Claims, 2 Drawing Sheets

(51) Int. Cl.
*C09D 7/40* (2018.01)
*C09D 5/16* (2006.01)
*C09D 5/00* (2006.01)
*C09D 1/00* (2006.01)

(52) U.S. Cl.
CPC .................. *C09D 7/61* (2018.01); *C09D 7/67* (2018.01); *C09D 7/68* (2018.01); *C03C 2217/42* (2013.01); *C03C 2217/445* (2013.01); *C03C 2217/478* (2013.01); *C03C 2217/75* (2013.01); *C03C 2217/77* (2013.01); *C03C 2218/111* (2013.01)

(58) Field of Classification Search
CPC .......... C03C 2217/445; C03C 2217/42; C03C 2217/77; C09D 7/1275; C09D 5/1681; C09D 7/1216; C09D 5/00; C09D 1/00; C09D 7/1266; C09C 7/1266
See application file for complete search history.

(56) References Cited

U.S. PATENT DOCUMENTS

| | | | | |
|---|---|---|---|---|
| 2008/0260664 | A1* | 10/2008 | Walenzyk et al. | A61K 8/0283 424/60 |
| 2010/0035039 | A1* | 2/2010 | Jing | C08J 7/04 428/304.4 |
| 2010/0092765 | A1* | 4/2010 | Hager | B82Y 30/00 428/331 |
| 2012/0052289 | A1* | 3/2012 | Jing | B82Y 30/00 428/331 |
| 2012/0181346 | A1* | 7/2012 | Greer | C03C 15/00 239/1 |
| 2012/0273000 | A1 | 11/2012 | Jing | |
| 2012/0276369 | A1* | 11/2012 | Jing | B82Y 30/00 428/331 |

FOREIGN PATENT DOCUMENTS

| | | |
|---|---|---|
| WO | WO 2012-167017 | 12/2012 |
| WO | WO 2013188083 | 12/2013 |
| WO | WO 2014-008383 | 1/2014 |

OTHER PUBLICATIONS

Materne et al, 2006, Organosilane Technology in Coating Applications: Review and Perspectives, Dow Corning.*
International Search Report for PCT International Application No. PCT/US2015/14161, dated Apr. 20, 2015, 3pgs.
Supplemental European Search Report for EP15745789 dated Sep. 22, 2017.

* cited by examiner

ANTI-SOILING COMPOSITIONS FOR DRY AND WET SOIL

CROSS REFERENCE TO RELATED APPLICATIONS

This application is a national stage filing under 35 U.S.C. 371 of International Application No. PCT/US2015/014161, filed Feb. 3, 2015, which claims the benefit of U.S. Provisional Application No. 61/935,579, filed Feb. 2, 2014. The disclosures of both applications are incorporated by reference in their entirety herein.

A coating composition is provided comprising nanoparticles and certain silane compounds. When applied to articles, particularly glass articles, the coating that is formed is resistant to soiling by both dry dust and wet soil.

BACKGROUND

Renewable energy is energy derived from natural resources that can be replenished, such as sunlight, wind, rain, tides, and geothermal heat. The demand for renewable energy has grown substantially with advances in technology and increases in global population. Although fossil fuels provide for the vast majority of energy consumption today, these fuels are non-renewable. The global dependence on these fossil fuels has not only raised concerns about their depletion but also environmental concerns associated with emissions that result from burning these fuels. As a result of these concerns, countries worldwide have been establishing initiatives to develop both large-scale and small-scale renewable energy resources. One of the promising energy resources today is sunlight. Globally, millions of households currently obtain power from solar energy generation. The rising demand for solar power has been accompanied by a rising demand for devices and materials capable of fulfilling the requirements for these applications.

The performance of glass surfaces of optical components ("optical surfaces"), such as those that transmit, absorb or reflect light when in use, is reduced if/when the optical surface becomes soiled. Soiling generally reduces light transmittance, increases absorbance, and/or increases light-scattering. This is particularly problematic for optical surfaces that are subjected to constant outdoor exposure. Examples of such optical surfaces include, but are not limited to, the glass sun-facing surfaces of photovoltaic (PV) modules, the glass surface of mirrors employed in solar energy generation systems wherein the function of the mirror is to direct incident sunlight to a collecting device or PV module with or without simultaneous concentration of the light, glass lenses (e.g., Fresnel lenses) and glass architectural glazing (e.g., windows). In some applications, glass substrates include a layer of glass and a layer of metal. Mirrors with high specular or total hemispherical reflectance may be used in certain solar energy generation systems, and such mirrors are particularly susceptible to degradation of performance by even small amounts of soiling.

Many solar power systems are installed in dry locations with periods of low relative humidity where dust accumulation is a particular problem. The present inventors have previously developed coating compositions and application methods that provide resistance to dust accumulation (for example, PCT Application No. PCT/US2013/049300, which is incorporated by reference herein in its entirety. However, in other locations where PV arrays or CSP systems are installed and even in some desert locations there are other soiling mechanisms that are due to or are influenced by the presence of water, for example, soiling from soil-water slurries that form during seasonal wet periods, light rain and/or light or heavy condensation. The previously developed coatings provide little resistance to soiling mechanisms that occur due to the presence of water. Other coating compositions have been developed that will readily shed water, but these do not address the problem of dust accumulation and are generally only useful under limited conditions where soiling occurs in the presence of water, for example, they are usually most effective at resisting soiling from soil-water slurries that contain very little soil. There is thus a need for improved coatings that will accomplish both reduction in soiling due to dry dust and a reduction in soiling occurring in the presence of soil and water combinations.

SUMMARY

The present disclosure may refer to some embodiments as "preferred," or "more preferred," or may use other language that denotes that some embodiments may be preferred in certain instances over other embodiments. The disclosure of that type of preferences is intended to serve as guidance to the reader about some embodiments that under certain circumstances may perform better than other embodiments, but is not intend to exclude less preferred embodiments from the scope of the present invention. The inventors of the present disclosure recognized that in many outdoor locations soiling results from a combination of events including the accumulation of air-borne dust and soiling that results from multiple mechanisms wherein water and soil are present and combined in various amounts, and combinations of these.

The inventors of the present application recognized that the performance of optical surfaces is reduced if the surface is soiled, whether due to accumulation of air-borne dust or soiling that occurs in the presence of water and soil or some combination thereof. The inventors of the present disclosure discovered coating compositions and application methods that reduce the amount of soiling that accumulates on an optical surface over a period of time.

The inventors of the present disclosure recognized that soiling can result in decreased performance and/or efficiency of a solar energy generating device. Decreased performance and/or efficiency can result in decreased energy generation. The inventors of the present disclosure discovered coating compositions and application methods that maintain or increase the amount of energy generated by solar devices.

The inventors of the present disclosure recognized that in many instances the owners or operators of solar energy generating devices do not wish to remove soil from optical surfaces, due to the time and expense involved as well as scarcity of water for cleaning in some locations. However, they do welcome adventitious cleaning that may be accomplished by naturally occurring events, such as a light rainfall.

The inventors of the present disclosure recognized that optical components may be installed in environmentally sensitive locations, be operated by persons who are particularly interested in protecting the environment, and/or need to meet various environmental, health, and safety requirements. Environmental, health, and safety requirements are becoming increasing difficult to meet, and there is a need for coating compositions that contain little or preferably no solvents, surfactants, wetting agents, leveling agents, or other additives that are typically used to achieve advantageous coating properties, such as uniform spreading.

The inventors of the present disclosure recognized the following additional preferences for coating compositions and methods. It is preferable that the coating be durably adhered to the optical surface. The coating method is preferably suitable for use in a variety of outdoor situations and must not require large, heavy or sophisticated equipment, process controls or highly skilled workers. Equipment or materials that are adjacent to optical surfaces, such as, for example, frames, support structures, racking, structural elements, sealants, caulking, painted surfaces, signing, and the like, must not be damaged or degraded by the coating composition and application method, as might happen if the coating composition was inadvertently applied to an adjacent component and not removed. For example, materials that cause oxidation of organic materials, including photo-activated oxidative materials and thermal or photoactivated oxidative catalysts, are preferably excluded. Particularly in desert locations, water is scarce and the amount of water required for the coating composition and/or application method should be minimal.

The existing art does not describe coating compositions or methods of application to simultaneously accomplish many or all of the goals described above. However, the inventors of the present disclosure discovered coating compositions and methods of application to simultaneously accomplish many or all of the goals described above. In at least some embodiments, the performance and appearance of the coated article may depend on one or more of coating composition and the coating method.

BRIEF DESCRIPTION OF THE DRAWINGS

The figures are not necessarily to scale and the materials are not necessarily shown in the proportions described in this disclosure. It will be understood that the use of a number to refer to a component in a given figure is not intended to limit the component in another figure labeled with the same number.

DETAILED DESCRIPTION

In the following detailed description, reference may be made to the accompanying set of drawings that form a part hereof and in which are shown by way of illustration several specific embodiments. It is to be understood that other embodiments are contemplated and may be made without departing from the scope or spirit of the present disclosure.

Many solar energy generation devices are installed in locations where solar irradiance is high, due to combination of latitude and climate conditions (e.g., a climate where there is generally very little cloud cover). Further, for utility-scale solar energy installations, a large amount of land is needed. Thus many solar energy systems are advantageously installed in hot, dry climates and, in particular, in deserts. The amount of energy produced by a solar energy system decreases as soil accumulates, resulting in losses of from about 5% to about 40% relative to the originally installed, clean solar energy system. There is also a need to prevent soil accumulation on the windows of buildings. It is time-consuming and expensive to clean windows, and in some locations water for this purpose may be scarce.

Desert locations may have periods of very low relative humidity, as low as 20% or even as low as 5% relative humidity, especially during the heat of the day, and the accumulation of dry dust is especially a problem under these conditions. In particular, glass surfaces of optical components installed outdoors in dry locations accumulate dry dust, particularly during periods of low relative humidity. This dust or soil can significantly reduce the performance of the optical component. The composition of air-borne dust, the mechanisms by which it is attracted to and adhered to a glass surface, and the effect of this dust on performance are significantly different than other types of soiling, such as soiling that occurs in the presence of water. Most air-borne dust particles are very small, typically less than 5 microns in diameter (or, if non-spherical, its largest dimension is less than 5 microns) and often less than 1 micron in diameter. Without wishing to be bound by theory, the inventors believe that the adhesion of such small particles to a surface depends on topographical features, especially roughness, on the surface. This may be particularly true if those features are of dimensions that are of similar dimensions as that of the dust particle, for example, from about 1% to about 100% of the size of the dust particle, such that adhesion, such as might be due to van der Waals forces, is reduced due to the reduced contact area between the particle and the rough surface.

However, most desert locations will also experience periods of higher relative humidity and daily temperature fluctuations that may lead to condensation of water on solar optical surfaces. Additionally, most desert locations typically experience at least small amounts of rainfall during at least a portion of a typical annual cycle; in fact, it is only in the driest places on earth, such as in some portions of the Atacama Desert in Chile, where rainfall has never been recorded. Thus in most locations, including most desert locations, there is also a soiling component that is water-mediated, due to seasonal wet periods, light rain and/or light or heavy condensation. There are several aspects of water-mediated soiling. One aspect of water-mediated soiling is that soil suspensions or slurries of water and soil may be produced, either by water falling or condensing onto a surface that already has some air-borne or other soil on it, or by soil being captured by water droplets, either as they fall through dusty air and fall onto the surface, or by soil being captured by water droplets as they reside on a surface and air-borne dust passes by and is captured. There are other variations on these combinations, but the end result is a slurry of water and soil, in various proportions of water to soil. These water-soil slurries may move over the surface, whether at initial impact or during flow due to gravity. Without wishing to be bound by theory, the inventors believe that as these water-soil slurries move over the surface, the particles will experience shear forces, and shear-thickening may occur, leading to regions of concentrated or compacted soil. Alternatively, the water may evaporate from a water-soil slurry, again leaving portions of concentrated or compacted soil. Concentrated or compacted soil produced by these mechanisms may be surprisingly difficult to remove; immediately after formation, even without drying, it may be difficult or impossible to remove by gentle methods such as rinsing with clean water or by the action of subsequent rainfall. Mechanical action (scrubbing) is not desirable but it may be required to remove concentrated or compacted soil. Although the reasons for the apparent "structural integrity" of concentrated or compacted soil are not well understood, it is quite common to find difficult-to-remove soil, such as water spots, streaks, or even smooth layers of soil on many outdoor surfaces that have been exposed to some combination of soil and water.

Furthermore, the formation of compacted or concentrated soil is more likely to occur as the ratio of soil to water increases, that is, as more soil is present (as compared to the amount of water) in a soil-water slurry, compacted or concentrated soil is more likely to form, and when less soil is present (as compared to the amount of water) in a soil-water slurry, compacted or concentrated soil is less likely to form. It is occasionally observed that in areas with frequent, typically daily heavy rainfall, and where as a result there are very low ratios of soil to water in slurries that may form on a surface, soiling due to dry dust or water-soil slurries is not a significant problem. However, in most locations worldwide, there will be a portion of time during the annual cycle when a soil-water slurry is formed in a soil-to-water ratio that results in compacted or concentrated soil on a surface, which may then be difficult to remove, except with mechanical action. Additionally, since it is advantageous to achieve lower soil-water ratios whenever water is present (to minimize the formation of concentrated or compacted soil), it is desirable to minimize the accumulation of dry dust during periods of little or no water, so as to both reduce losses due to soiling during dry seasons and simultaneously reduce the ratio of soil-to-water for the amount of water that may be present when, for example, a light rain does occur.

Those skilled in the art will realize that that are certain circumstances among those described above, when it will be impossible to prevent the formation of water-soil slurries on a surface and also impossible to prevent some of these slurries from drying. So, while it is advantageous to minimize the accumulation of dry dust by applying a coating to a surface, it is also necessary for that coating to additionally provide an improved means for easy removal of concentrated or compacted soil that may result from the water-soil slurries, such as removal of concentrated or compacted soil by rinsing without mechanical action or by gentle rainfall.

Coatings that function to reduce the accumulation of dry dust, reduce the formation of compacted or concentrated soil from soil-water slurries and/or enhance the removal of concentrated or compacted soil in the presence of water without the use of mechanical action, including adventitious cleaning by light rain or condensation, are considered to have anti-soiling properties. In different locations worldwide, as climate and weather patterns vary, it may be preferable to use coatings that reduce the accumulation of dry dust, reduce the formation of compacted or concentrated soil from soil-water slurries and/or enhance the removal of concentrated or compacted soil in the presence of water without the use of mechanical action in different proportions; that is, in one location a useful coating may be optimized to provide very high reduction of dry dust accumulation and medium removal of concentrated or compacted soil in the presence of water, while in another location a useful coating may provide medium reduction of dry dust accumulation and high removal of concentrated or compacted soil in the presence of water. Various combinations of coating attributes may be useful in various locations and are within the scope of this invention.

Many optical surfaces, in solar energy generating systems and on windows, have been designed to have specific properties, which may be related to performance (transmission, absorption, reflectance, haze, scattering/diffusion, etc.) or aesthetics (color, reflectance, etc). Often, these properties are provided in the glass as part of a manufacturing step, prior to installation or incorporation into the final system or structure. Preferably, coatings applied to an installed system or structure do not change these performance or aesthetic properties. Consequently, it is preferable in at least some embodiments, that the final, dry coating be very thin (e.g., less than about 50 nm). For example, a coating of 125 nm may be transparent and provide anti-reflective behavior to a glass surface, but this reduction in reflectivity may be undesirable in some embodiments if a certain amount of reflectance was designed into the glass for its intended function or appearance. Further, at low viewing angles, a coating of 125 nm will have a longer effective path length for incident light and give the appearance of being purple or blue. Coatings of 100 nm, or even 75 nm, can provide visual effects, particularly when viewed at low angles. A coating that is less than about 50 nm thick will typically produce no such visual effects, that is, it will be invisible. As used herein, "invisible" means that the coating will not cause any significant optical effect that may be detected by the average human eye. Additionally, the inventors believe that the average coating thickness must be no more than about twice as thick as the average diameter of the large nanoparticles in the coating composition, preferably no more than 1.5 times as thick, more preferably no more than 1 times as thick, even more preferably no more than 0.75 times as thick, in order to achieve the desired surface roughness.

The present disclosure provides a liquid coating composition comprising an aqueous dispersion of a first set of silica nanoparticles having average diameter of less than 20 nm (hereafter referred to as small nanopoarticles), a second set of silica nanoparticles having an average diameter of 20 to 120 nm (hereafter referred to as large nanoparticles), a silane comprising at least one hydrolysable group and at least one organic group bound to the silicon atom of the silane via a carbon atom, wherein the organic group is substituted with one or more groups chosen from (a) hydroxy groups, (b) groups comprising —(CHRCH$_2$O)$_n$—, wherein n is an integer from 1 to 50 and R is a monofunctional group independently selected for each unit, (c) anionic groups or the conjugate acids thereof, and (d) cationic groups or the conjugate bases thereof, preferably a plurality of one or more of these substituents, and optionally an acid with pK$_a$ less than or equal to 3.5. Preferably the hydroxy groups are bonded to a carbon atom of the organic group. Preferably in the groups comprising —(CHRCH$_2$O)$_n$— units the carbon at one end of each unit and the oxygen at the other end of each unit are each bonded to another atom The small nanoparticles have an average diameter of less than 20 nm, preferably less than 10 nm. Because of their small diameter, the small nanoparticles have a very large amount of surface area and the silicon atoms at the surface are very reactive. Without wishing to be bound by theory, the inventors believe that the small nanoparticles are sufficiently reactive to form chemical bonds to the substrate and to other nanoparticles (both large and small). The large nanoparticles have an average diameter of 20 to 120 nm, preferably 20 to 75 nm, or in another embodiment preferably 40 to 120 nm, or in another embodiment preferably 40 to 75 nm. Without wishing to be bound by theory, the inventors believe that the large nanoparticles are necessary to create a dried coating with a particular surface roughness. The liquid coating composition contains a bimodal distribution of silica nanoparticles, with the small nanoparticles selected to provide desirable reactivity and the large nanoparticles selected to provide desirable surface roughness.

The silane hydrolysable group contains a bond to the silicon atom and may be a halogen atom, such as chlorine, a hydroxy (—OH) group (which is sometimes referred to as a silanol group when it is attached to silicon, that is, Si—OH) or the sodium salt thereof (that is, Si—O$^-$Na$^+$), an amino group such as NH$_2$ or an alkoxy group such as methoxy, ethoxy, iso-propoxy, n-propoxy and the like. In some embodiments hydroxy or alkoxy groups may be preferred. Silane hydrolysable groups may react with water and they may also react with other hydrolysable groups on another silicon atom, such as another hydrolysable group on another silane molecule or with an hydroxy group on a silicon atom in a glass substrate or silica nanoparticle, in various combinations.

The silane organic group comprises at least one carbon atom and preferably is not readily hydrolysable, that is, it does not readily exchange and is not readily removed from the silicon atom. Preferably, at least one carbon atom in the organic group is bonded to the silane via a silicon-carbon bond. Additionally, the silane organic group comprises at least one of (a) hydroxy groups (b) groups comprising $(CHRCH_2O)_n$—, wherein n is an integer from 1 to 50 and R is a monofunctional group independently selected for each unit, (c) anionic groups or the conjugate acids thereof, and (d) cationic groups or the conjugate bases thereof.

One substituent on the silane organic group may be a hydroxy group bonded to a carbon atom. Preferably there are two or more hydroxy groups attached to two or more carbon atoms. Examples of such groups are the groups —$CH_2CH_2OH$, —$CH_2CH_2CH_2OH$, —$CH_2CH(OH)$ $CH_2OH$, —$(CH_2CH(OH)CH_2CH(OH))$—$CH_2CH_2(OH)$ and many other variations and combinations as are apparent to those skilled in the art.

Another substituent on the silane organic group may be a groups comprising units of the structure —$(CHRCH_2O)_n$— wherein n is an integer from 1 to 50, and R is a monofunctional group, for example, a hydrogen, an alkyl group such as methyl, ethyl or propyl, a hydroxy group, or a group that binds through one or more organic bonds to the silicon atom, for example —$OC(=O)N(H)CH_2CH_2CH_2Si(OCH_3)_3$ (the hydrolysable groups on silicon are included in this particular example). A plurality of these groups may be attached to one another in the structure-$(CHRCH_2O)_n$— where n is an integer from 1 to about 50 preferably 1 to about 25, and the R in each unit may be the same or different. Many other variations and combinations as are apparent to those skilled in the art.

Another substituent on the silane organic group may be an anionic group. Examples of anionic groups include carboxylates, sulphonates and phosphonates, with counter ions such as sodium, potassium and the like. Also included within this group are the conjugate acids of these anions, for example, the group may be a carboxylic acid, a sulfonic acid or a phosphonic acid group. Particularly when the liquid coating composition contains an acid with pKa less than or equal to 3.5, some or all of the anionic groups on the silane organic groups are likely to be protonated, that is, to be found as the conjugate acid of the corresponding anion.

Another substituent on the silane organic group may be a cationic group. Examples of cationic groups include ammonium, sulfonium and phosphonium groups, optionally comprising on or more alkyl substituents, with counter ions including halogens such as chloride, bromide and iodide, hydroxide ions, inorganic anions such as sulfate and organic anions such as acetate. Also included in this group are the corresponding conjugate bases of these cations. For example, in a coating composition at high pH an ammonium salt is likely to be deprotonated and may be found as the corresponding amine. Examples of cationic groups include —$N(CH_3)_3^+Cl^-$, —$NH(CH_3)_2^+Cl^-$, —$NH_2(CH_3)^+Cl^-$, —$NH(CH_2)_2NH(CH_2)_2NH_3^+Cl^-$, and many other variations as will be apparent to those skilled in the art.

Various combinations of hydrolysable groups on the silanes as well as various combinations of organic groups with various combinations of substituent hydroxy, anionic, cationic and —$(CHRCH_2O)_n$— groups are within the scope of this invention. Those skilled in the art recognize that other groups may also be present in the silane organic group, for example to provide for a useful method of synthesis of the silane. Those skilled in the art recognize that anionic groups on the silane organic groups may be formed in the liquid coating compositions of the invention by mixing the corresponding conjugate acid into water with silica nanoparticles at a pH greater than about 8. Similarly, those skilled in the art recognize that the cationic groups on the silane organic groups may be formed in the liquid coating composition by mixing the conjugate base into water with silica nanoparticles and adjusting the pH to less than about 5 with an acid of pKa of 3.5 or less.

Examples of silanes useful in the present invention include 3-(trihydroxysilyl)-1-propane sulfonic acid, octadecyldimethyl(3-trimethoxysilylpropyl)ammonium chloride, tetradecyldimethyl(3-trimethoxysilylpropyl)ammonium chloride, N-trimethoxysilylpropyl-N,N,N-trimethyl ammonium chloride, N-(3-triethoxysilylpropyl)gluconamide, N-(triethoxysilylpropyl)-O-polyethylene oxide urethane (containing about 4 to 6 —$CH_2CH_2O$— units), N-(trimethoxysilylpropyl)-N,N-dimethyl-N-(propyl sulfonic acid)ammonium chloride, [N-(trimethoxysilylpropyl) ethylenediamine, triacetic acid] trisodium salt, (3-trimethoxysilylpropyl)diethylenetriamine, trihydroxysilylpropylmethylphosphonate sodium salt, carboxyethylsilanetriol sodium salt, (trimethoxysilylpropyl) isothiouronium chloride, and 3-trihydroxysilylpropylmethyl phosphonate sodium salt. Many exemplary silanes are produced by Gelest, Inc. (Morrisville Pa.). Other exemplary silanes are produced by Shin-Etsu Chemical Co., Ltd. (Toyko, Japan). Other examples of silanes are disclosed in US 2012/273000, which is incorporated by reference herein for its disclosure of silanes.

Preferably, the pH of the coating liquid is less than 5.0, more preferably less than 4.0.

Preferably, the coating composition includes at most 2% by weight, preferably at most 0.5% by weight, more preferably at most 0.1% by weight and more preferably still essentially no (based on the total weight of the liquid) of detergents, surfactants, leveling agents, colorants, dyes, perfumes, binders or materials that can act as oxidizers, oxidative catalysts or oxidative photocatalysts. By "essentially no", we mean substantially no amount of material except for traces that may be present unintentionally as impurities. Thus, in some embodiments, the coating compositions consist essentially of water, the first and second sets of silica nanoparticles described above, and the silanes described above. Binders are known to those skilled in the art and are typically high molecular weight polymers, for example, polymers of molecular weight greater than about 50,000 amu, crosslinked polymers, or monomers, polyfunctional or oligomeric compounds that are reacted to form polymers or crosslinked polymer networks during or after the coating process, and various combinations of these, wherein the main chain or backbone of the polymer chain is organic. The inventors believe that, in some embodiments, such binders may result in coatings which are more susceptible to weathering an degradation when used outdoors, and that, in some embodiments, such binders may also reduce effectiveness as an anti-soiling coating.

Accordingly, in one embodiment, the antisoiling coating composition comprises an aqueous dispersion consisting essentially of: water; a first set of silica nanoparticles having an average diameter of less than 20 nm; a second set of silica nanoparticles having an average diameter of 20 nm to 120 nm; and a silane comprising at least one hydrolyzable group and at least one organic group bound to the silicon atom of the silane via a carbon atom, wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof.

The present disclosure further provides a method of providing a coating to a substrate comprising applying the liquid coating composition to the substrate, optionally removing a portion of the liquid coating composition after a period of time, and removing the volatile components from the liquid coating composition that has been applied to the substrate. The coating method may comprise one or more liquid components and one or more steps, in any combination. PCT Application No. PCT/US2013/049300 describes various embodiments of coating methods whose steps can be used in the application of the coating compositions of the present disclosure. The original claims of PCT Application No. PCT/US2013/049300, as well as its disclosure associated with coating methods are incorporated by reference herein. Preferably the substrate comprises an inorganic material, more preferable a metal oxide, most preferably silica. A particularly suitable substrate is a silica-containing glass, for example, soda-lime glass, low-iron soda-lime glass, borosilicate glass, and many other silica-containing glasses as are well-known.

In another embodiment, the disclosure is directed to a method of forming a coating on a glass substrate, comprising: (i) applying an aqueous coating composition to the glass substrate; wherein the applied coating composition has a thickness of greater than 4 microns; wherein the aqueous coating composition comprises an aqueous dispersion consisting essentially of: water, a first set of silica nanoparticles having an average diameter of less than 20 nm; a second set of silica nanoparticles having an average diameter of 20 nm to 120 nm; and a silane comprising at least one hydrolyzable group and at least one organic group bound to the silicon atom of the silane via a carbon atom, wherein the organic group is substituted with one or more groups chosen from: (a) hydroxy groups, (b) groups comprising (CHRCH$_2$O)n units, wherein n is an integer from 1 to 50 and R is a monofunctional group independently selected for each unit, (c) anionic groups or the conjugate acids thereof, (d) cationic groups or the conjugate bases thereof, and (e) combinations thereof; (ii) reducing the thickness of the coating composition to about 0.25 to 4 microns; and; (iii) evaporating at least some of the water.

The present disclosure further provides a coated substrate or article, wherein the coating comprises a dried mixture of nanoparticles having average diameter of less than 20 nm, nanoparticles having of 20 to 120 nm, and a silane comprising at least one organic group bound to the silicon atom of the silane via a carbon atom, wherein the organic group is substituted with one or more groups chosen from (a) hydroxy groups, (b) groups comprising —(CHRCH$_2$O)$_n$—, wherein n is an integer from 1 to 50 and R is a monofunctional group independently selected for each unit, (c) anionic groups or the conjugate acids thereof, and (d) cationic groups or the conjugate bases thereof, wherein the components may preferentially be partially bonded together by chemical bonds. Preferably the dried mixture is partially bonded to the substrate. Preferably the dried coating mixture has an average thickness of from about 0.5 nm to about 100 nm, more preferably about 2 nm to about 75 nm average thickness, even more preferably about 5 nm to about 50 nm average thickness. Preferably the coating has an average surface roughness of between about 5 nm and about 100 nm over a 5 microns by 5 microns area.

In yet another embodiment, the coated article comprises a dried coating, wherein the dry coating consists essentially of: a first set of silica nanoparticles having an average diameter of less than 20 nm; a second set of silica nanoparticles having an average diameter of 20 nm to 120 nm; and a silane comprising at least one organic group bound to the silicon atom of the silane via a carbon atom, wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof; wherein the average surface roughness of the dried coating is from 5 nm to 100 nm over a 5 micron by 5 micron area.

The coated substrate derived from the coating composition may be hydrophilic. The coated substrate may be sufficiently hydrophilic that a water drop applied to the surface immediately spreads on the surface and it may spread so rapidly and over such a large area, that it is difficult or impossible to measure the so-called contact angle.

When contact angles are almost zero degrees or immeasurable, the surface is often described as "superhydrophilic." Superhydrophilic coatings have been previously described. Comparative Example CE 101 (Coated Glass) and Comparative Example CE 201 (Coated Mirror) are superhydrophylic. Superhydrophilic surfaces may resist the accumulation of dry dust. However, the property of superhydrophilicity alone is not sufficient to provide for easy removal of concentrated or compacted soil produced from soil-water slurries. Without wishing to be bound by theory, the inventors believe that enhancing the retention of a very thin layer of water and/or enhancing the mobility of a very small amount of water on the surface will provide for easy removal of concentrated or compacted soil. The water layer may be only a monolayer or a few monolayers thick and thus very difficult to observe by known analytical techniques. Thus a functional test specifically designed to measure the ability of water to remove concentrated or compacted soil without the use of mechanical action or force, and in the absence of as many other factors as possible, is used herein to measure the effectiveness of the coatings and comparative coatings in the present disclosure. The details are described below for the performance of a "Wet Drip Test." Coatings of the present disclosure perform better than uncoated glass in the Wet Drip Test and also perform better than bare glass as tested on glass mirrors in the Dry Dust Test (described below).

One exemplary coating composition includes between about 0.25% to about 5% by weight of non-oxidizing small nanoparticles of less than 20 nm average diameter, from about 0.25% to about 5% by weight of non-oxidizing large nanoparticles of 20 to 120 nm average diameter, from about 0.1% to 5% by weight of a silane comprising at least one hydrolysable group and at least one organic group bound to the silicon atom of the silane via a carbon atom, wherein the organic group is substituted with one or more groups chosen from (a) hydroxy groups, (b) groups comprising —(CHRCH$_2$O)$_n$—, wherein n is an integer from 1 to 50 and R is a monofunctional group independently selected for each unit, (c) anionic groups or the conjugate acids thereof, and (d) cationic groups or the conjugate bases thereof, wherein the weight percent is measured with respect to the total weight of the composition, Preferably the coating composition includes a plurality of one or more of these groups, an acid, and water. Preferably the coating composition is an aqueous dispersion. The aqueous continuous liquid phase may be essentially free of organic solvents, except for very small amounts as may unavoidably be present as impurities in water supplies used to prepare the coating compositions (typically less than 0.1% and preferably less than 0.01%) and for amounts that may form from hydrolysis of alkoxy groups on the silane.

In some embodiments, the nanoparticles are nominally spherical. The nanoparticles may agglomerate into larger, non-spherical shapes, but substantial agglomeration is not preferred.

Exemplary commercially available silica nanoparticles for use in the coatings described herein include, for example, nonporous spherical silica nanoparticles in aqueous media (sols). For example, products under the trade designations LUDOX from WR Grace and Company of Columbia, Md., NYACOL from Nyacol Co. of Ashland, Mass., or NALCO from Nalco Chemical Co. of Naperville, Ill. One silica sol that is useful as a small nanoparticle, with a volume average particle size of 5 nm and a nominal solids content of 15 percent by weight, is available as NALCO 2326 from Nalco Chemical Co. Other useful commercially available silica sols include those available as NALCO 1115 (4 nm) and NALCO 1130 (8-9 nm) from Nalco Chemical Co., as REMASOL SP30 (8-9 nm) from Remet Corp. of Utica, N.Y., and as LUDOX SM (7 nm) from WR Grace. One silica sol that is useful as a large nanoparticle, with a volume average particle size of 45 nm and a nominal solids content of 40%, is available as NALCO DVSZN004 from Nalco Chemical Co. Other useful commercially available silica sols include those available as NALCO 2329 (75 nm) from Nalco Chemical Co. and LUDOX™ (22 nm) available from WR Grace.

These silica nanoparticle coating compositions, when acidified, can be coated directly onto glass substrates without either organic solvents or surfactants using the methods of this application to produce surprisingly thin coatings. The coating compositions are coatable on various glass substrates with various surface contaminants, and thus variable contact angles, when they are acidified to pH=2 to 3, and even to 5 in some embodiments.

Not wishing to be bound by theory, the inventors believe that silanol groups (—Si—O—H) on the surface of the small silica nanoparticles react (condense) with silanol groups on the glass surface over a period of time while the coating composition is still wet, that is, while it still contains a major portion of the water that was present when initially applied to the glass surface, to produce a glass surface containing bonded silica nanoparticles, that is, nanoparticles that are attached to the glass substrate by a chemical bond (an Si—O—Si bond). Such bonding is different than and more durable than adhesion by, for example, van der Waals forces. The number of small nanoparticles bonded to the glass substrate may be less than one monolayer of nanoparticles, that is, a sub-monolayer. The period of time required to produce the glass surface containing at least some bonded silica nanoparticles depends on the diameter of the nanoparticle (which is related to the surface area of the nanoparticle) and the concentration (percent by weight) of the nanoparticles in the liquid coating composition. Preferably, the small nanoparticles are at least 1% by weight of the coating composition. Without being bound by theory, the inventors believe that the bonded small silica nanoparticles on the glass surface act to reduce the receding contact angle of the very thin liquid films that are produced in subsequent steps, reducing de-wetting and enabling the formation of uniform very thin coatings. Additional chemical bonds maybe be formed via hydrolysis of the hydrolysable groups on the silane Large silica particles are also included in the coating composition in amounts that do not deleteriously decrease the coatability of the composition on a selected substrate and do not produce visible optical effects. The inventors believe that the large nanoparticles, in combination with the thickness of the dried coating on the substrate, produce a coating surface that has an average surface roughness of from 5 nm to 100 nm over a 5 micron by 5 micron area. These additional silica particles generally have an average primary particle size of 20 to 120 nanometers, preferably 20 to 75 nanometers, and may be used in ratios of 0.2:99.8 to 99.8:0.2, relative to the weight of the silica nanoparticles of less than 20 nanometers. Larger particles are preferably used in ratios of 1:9 to 9:1. Generally the total weight of silica particles (i.e. the total weight of <20 nm and larger silica particles) in the composition is 0.25 to 10 wt. %, preferably 1 to 10 wt. %, most preferably 2 to 7 wt. %.

The coating composition may contain an acid having a pKa ($H_2O$) of ≤3.5, preferably <2.5, most preferably less than 1. Useful acids include $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, and $CH_3SO_2OH$. Preferred acids include HCl, $HNO_3$, $H_2SO_4$, and $H_3PO_4$. The coating composition generally contains sufficient acid to provide a pH of less than 5, preferably less than 4. Generally, the coating composition is a solution containing an acid having a pKa ($H_2O$) of ≤3.5, preferably <2.5, most preferably less than 1. Nanoparticle coating compositions utilizing such acids are described in detail in PCT Patent Publication No. WO 2009/140482, incorporated herein in its entirety.

Coating compositions according to the present disclosure may be made by any suitable mixing technique. One useful technique includes combining alkaline spherical silica sols of appropriate particle size with water, adding silane and then optionally adding acid to adjust the pH to the final desired level. Another useful technique includes combining alkaline spherical silica sols of appropriate particle size with water, adding acid to adjust the pH to the desired level, and then adding silane. It may be useful to separately premix some components in one container and other components in another container, and to mix them immediately prior to use. It may be useful to mix some or all components from 1 to 60 hours prior to use.

Figure 1:
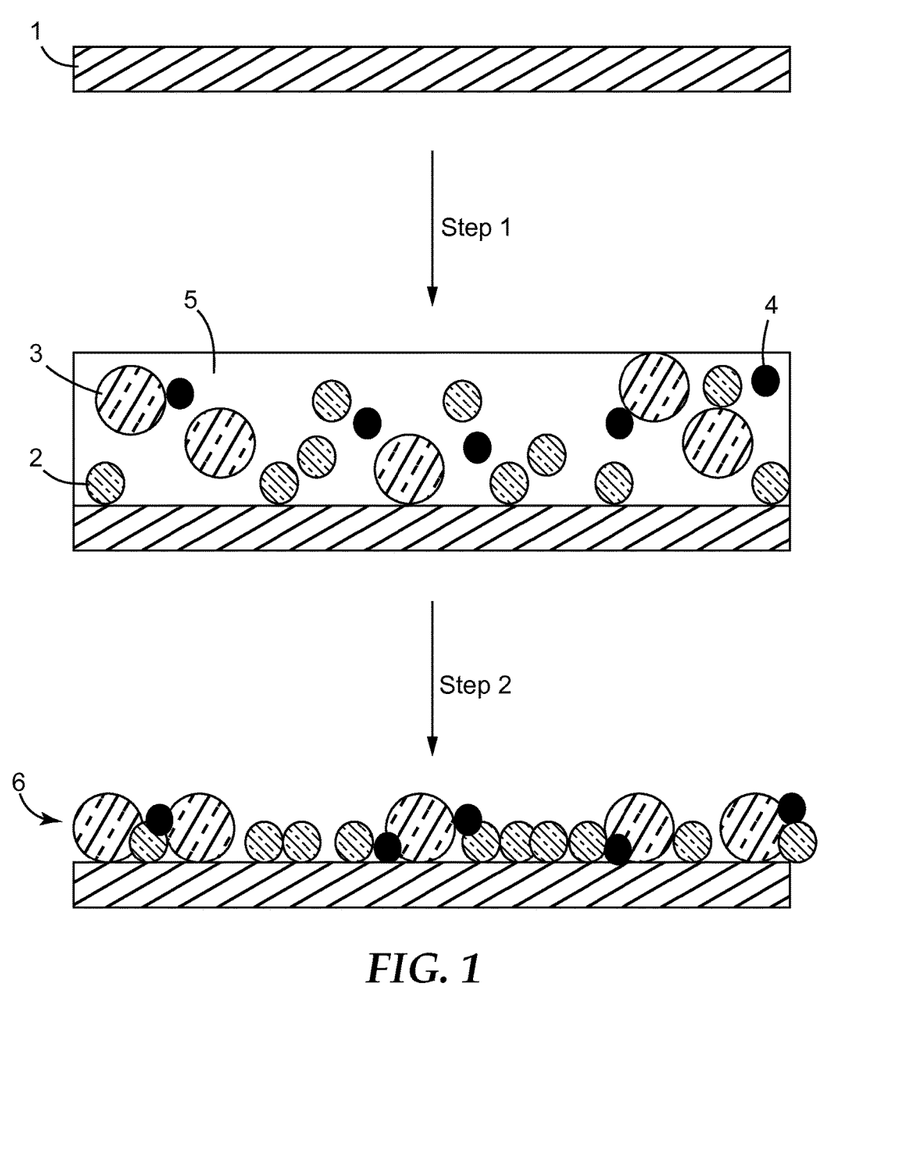
FIG. 1 shows a two-step process for application of a coating composition of the present disclosure to a substrate and subsequent formation of a dried coating on said substrate.

Referring to FIG. 1, some coating methods of the present disclosure involve applying the liquid coating composition (comprising small nanoparticles 2, large nanoparticles 3, silane 4 and water 5) to the substrate 1 for a period of time sufficient to allow at least some of the nanoparticles to react with the surface. The coating liquid may be applied by methods such as, for example, rolling, flooding, or submersion. The amount of time that is required for at least some nanoparticles to bond to the substrate surface is a function of the nanoparticle size, the concentration of nanoparticles in the coating composition, the composition of the substrate (such as glass), possible contaminants on the substrate, and pH, and may be in the range of 10 to 300 seconds. Optionally, coating methods may include an additional step wherein the thickness of the wet coating is reduced to between about 0.25 micron to 4 microns in thickness before drying. In some embodiments, the wet coating thickness is reduced to between about 0.5 and about 3 microns in thickness. Preferably, the wet coating thickness is in the range of 0.25 to 4 micrometers, more preferably 0.5 to 3 micrometers in the final step before evaporation of the water in the coating composition to form a coating 6. Evaporation may be accomplished by allowing the substrate to dry under ambient conditions, that is, to air dry. In some embodiments, substantially all of the water in the coating composition is evaporated, for example, at least 95% of the water is evaporated, preferably 98% of the water. Those skilled in the art will recognize that many materials, including glass, silica and the coatings of this invention, may retain traces of water, particularly on their surfaces, depending on ambient conditions, unless they are subjected to combinations of high temperatures (such as over 100° C. or even over 200° C.) and very low pressure (such as 0.1 standard atmosphere or even 0.01 standard atmosphere). After evaporation, a coating is formed. Preferably, coating 6 has an average surface roughness of between about 3 nm and about 100 nm over a 5 microns by 5 microns area, more preferably an average surface roughness of from 5 to 100 nm over a 5 micron by 5 micron area. Preferably coating 6 has an average thickness of about 2 nm to about 75 nm.

When the coating composition contains nanopaticles of two or more sizes, with some nanoparticles whose diameter is less than 20 nm (e.g., "small" nanoparticles) and some nanoparticles whose diameter is 20 nm or greater (e.g., "large" nanoparticles), a dry coating may have an average thickness over an area of 5 micron by 5 micron, for example, 25 nm average thickness, but over a smaller area (such as 40 nm×40 nm), there may be a large particle protruding from the coating for a thickness of 50 nm, and over another smaller area 40 nm×40 nm there may be only about several layers of small nanoparticles for a thickness of about 15 nm. Thus the surface of the dry coating may be rough on the scale of nanometers and such roughness may be detected by, for example, atomic force microscopy (AFM). It may also be possible to measure these various thicknesses by examining a cross-section of coating by, for example, scanning electron microscopy. For another example, if at least some of the substrate is exposed and can be detected by AFM as the base material/position, then AFM can also be used to measure coating thickness. As used herein, the term "average coating thickness" refers to the coating thickness over an area that is at least 20 times larger than the largest nanoparticle in the liquid coating composition, for example, for a liquid coating composition containing nanoparticles of diameters 4 nm and 42 nm, the average coating weight refers to the coating weight over an area of at least 0.84 micron× 0.84 micron.

The wet coating thickness is selected, in combination with the concentration of nanoparticles in the coating composition, to produce a dry coating (after evaporation) that has an average thickness of from about 0.5 nm to about 100 nm, more preferably about 2 nm to about 75 nm average thickness, even more preferably from about 5 nm to about 50 nm average thickness. One method to reduce the wet coating thickness is to draw a flexible blade across the wet glass surface. For example, a hand-held flexible blade may be used. Flexible blades may be made of any rubbery material, such as natural rubber or polymers such as plasticized poly(vinylchloride), silicone polymers, polyurethanes, polyolefins, fluoropolymers, and the like. Flexible blades are often referred to as "squeegees." Details of suitable coating methods have been described by the inventors in PCT Application No. PCT/US2013/049300, whose description of experimental methodology is incorporated by reference herein.

Figure 2:
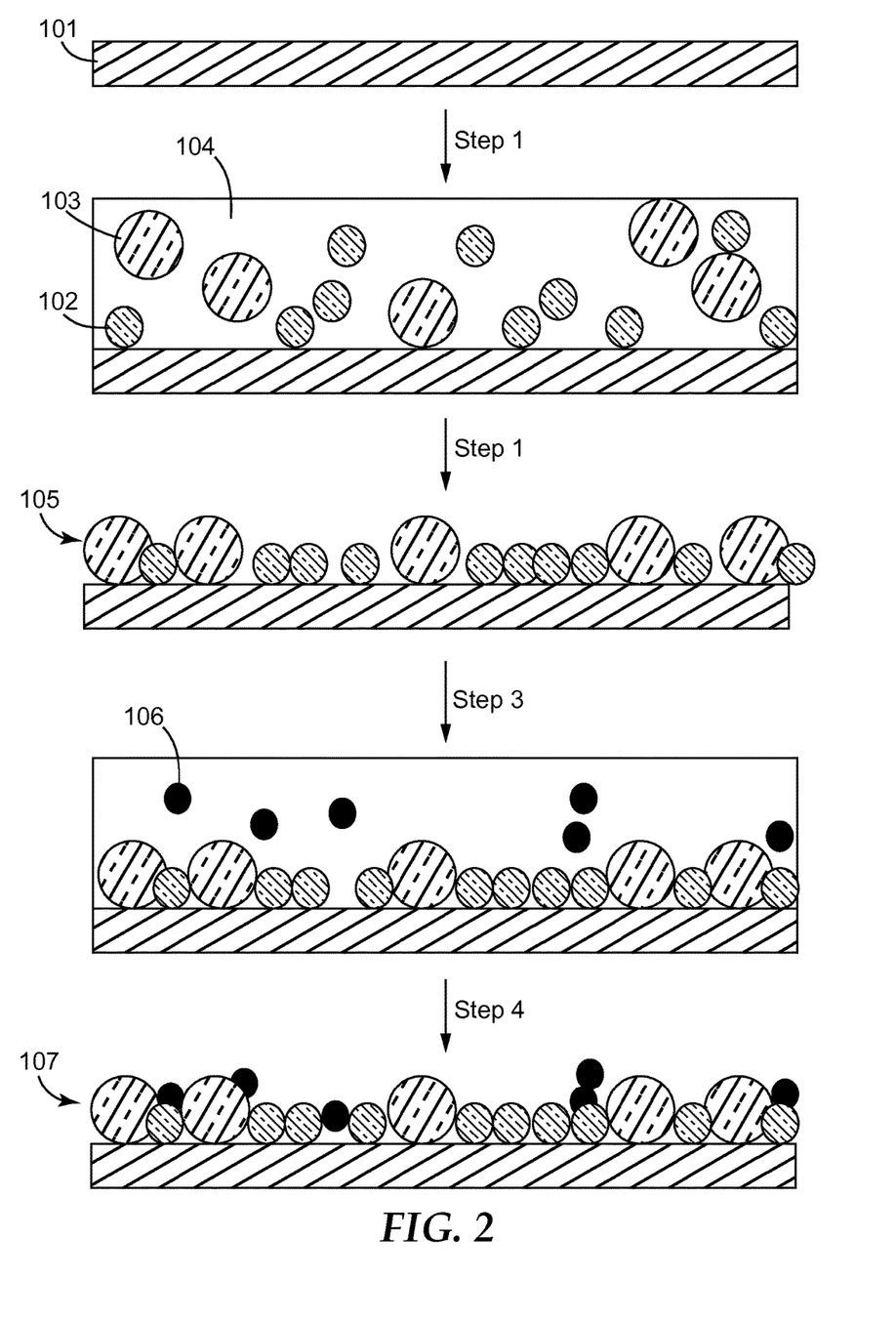
FIG. 2 shows a four-step process for producing a dried coating of the present disclosure on a substrate.

An example of an alternative coating method is shown in FIG. 2. This method involves applying the coating composition (comprising small nanoparticles 102, large nanoparticles 103, and water 104) to the substrate surface 101 for a period of time sufficient to allow at least some of the nanoparticles to react with the substrate surface as shown in FIG. 2. The coating liquid may be applied by methods such as, for example, rolling, flooding, or submersion. The amount of time that is required for at least some nanoparticles to bond to the substrate surface is a function of the nanoparticle size, the concentration of nanoparticles in the coating composition, the composition of the substrate (such as glass), possible contaminants on the substrate, and pH. Optionally, coating methods may include an additional step wherein the thickness of the wet coating is reduced to between about 0.25 micron to 4 microns in thickness before drying. In some embodiments, the wet coating thickness is reduced to between about 0.5 and about 3 microns in thickness. Preferably, the wet coating thickness is in the range of 0.25 to 4 micrometers, more preferably 1 to 4 micrometers in this step before evaporation of the water in the coating composition to form an intermediate coating 105. Preferably, coating 105 has an average surface roughness of between about 3 nm and about 100 nm over a 5 microns by 5 microns area. Evaporation may be accomplished by allowing the glass substrate to dry under ambient conditions, that is, to air dry. In a next step, silane 106 is applied to the surface, optionally as a solution or suspension in water. Optionally, a portion of this liquid may be removed. Preferably, the wet coating thickness at this step is in the range of 0.25 to 4 micrometers, more preferably 1 to 4 micrometers before evaporation of the water in the coating composition to form an final coating 107. Preferably, coating 107 has an average surface roughness of between about 3 nm and about 100 nm over a 5 microns by 5 microns area, more preferably an average surface roughness of from 5 to 100 nm over a 5 micron by 5 micron area. Preferably coating 107 has an average thickness of 2 to 75 nm.

In another embodiment, the inventors describe a method of forming a coating on a glass substrate, comprising: applying an aqueous coating composition to the glass substrate;
wherein the applied coating composition has a thickness of greater than 4 microns;
wherein the aqueous coating composition comprises an aqueous dispersion comprising one or more of the following components:
a first set of silica nanoparticles having an average diameter of less than 20 nm;
a second set of silica nanoparticles having an average diameter of 20 nm to 120 nm; and
a silane comprising at least one hydrolyzable group and at least one organic group bound to the silicon atom of the silane via a carbon atom,
wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof;

reducing the thickness of the coating composition to about 0.25 to 4 microns, and evaporating at least some of the water, wherein when the first aqueous coating composition does not contain all three components (i), (ii), and (iii) recited above, then the method further comprises the following steps:

applying a second coating composition to the glass substrate;

wherein the second applied coating composition has a thickness of greater than 4 microns wherein the second coating composition comprises at least one of the components (i), (ii), and (iii) recited above and missing from the first aqueous composition;

reducing the thickness of the coating composition to about 0.25 to 4 microns, and evaporating at least some of the water.

To reduce labor and thereby minimize process costs, it may be preferable to minimize the number of coating steps. In some embodiments, it may be preferred to utilize only one coating liquid, as depicted in FIG. 1.

Objects and advantages of this disclosure are further illustrated by the following non-limiting examples, but the particular materials and amounts thereof recited in these examples, as well as other conditions and details, should not be construed to unduly limit this disclosure.

Exemplary Embodiments

1. A coated article comprising a dried coating comprising:
 a first set of silica nanoparticles having an average diameter of less than 20 nm;
 a second set of silica nanoparticles having an average diameter of 20 nm to 120 nm; and
 a silane comprising at least one organic group bound to the silicon atom of the silane via a carbon atom,
  wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof.
 wherein the average surface roughness of the dried coating is from 5 nm to 100 nm over a 5 micron by 5 micron area.

2. The coated article according to embodiment 1, wherein the organic group in the silane is substituted with one or more hydroxy groups.

3. The coated article according to embodiment 1, wherein the organic group in the silane is substituted with one or more groups comprising —(CHRCH$_2$O)$_n$— units, wherein n is an integer from 1 to 50 and R is a monofunctional group independently selected for each unit.

4. The coated article according to embodiment 1, wherein the organic group in the silane is substituted with one or more anionic groups or the conjugate acids thereof.

5. The coated article according to embodiment 1, wherein the organic group in the silane is substituted with one or more cationic groups or the conjugate bases thereof.

6. The coated article according to any of the preceding embodiments, wherein the first set of silica nanoparticles has an average diameter of less than 15 nm.

7. The coated article according to any of the preceding embodiments, wherein the first set of silica nanoparticles has an average diameter of less than 10 nm.

8. The coated article according to any of the preceding embodiments, wherein the second set of silica nanoparticles has an average diameter of 20 nm to 80 nm.

9. The coated article according to any of the preceding embodiments, wherein the second set of silica nanoparticles has an average diameter of 40 nm to 75 nm.

10. The coated article according to any of the preceding embodiments, wherein the at least one hydrolizable group in the silane is chosen from alkoxy and hydroxy groups.

11. The coated article according to any of the preceding embodiments, wherein the silane is chosen from 3-(trihydroxysilyl)-1-propane sulfonic acid, octadecyldimethyl (3-trimethoxysilylpropyl)ammonium chloride, tetradecyldimethyl(3-trimethoxysilylpropyl)ammonium chloride, N-trimethoxysilylpropyl-N,N,N-trimethyl ammonium chloride, N-(3-triethoxysilylpropyl)gluconamide, N-(triethoxysilylpropyl)-O-polyethylene oxide urethane (containing from 4 to 6 —CH$_2$CH$_2$O— units), N-(trimethoxysilylpropyl)-N,N-dimethyl-N-(propyl sulfonic acid)ammonium chloride, [N-(trimethoxysilylpropyl)ethylenediamine, triacetic acid] trisodium salt, (3-trimethoxysilylpropyl)diethylenetriamine, trihydroxysilylpropylmethylphosphonate sodium salt, carboxyethylsilanetriol sodium salt, (trimethoxysilylpropyl)isothiouronium chloride, and 3-trihydroxysilylpropylmethyl phosphonate sodium salt, wherein at least some of the hydrolysable groups on the silane have been hydrolyzed.

12. The coated article according to any of the preceding embodiments, wherein the average surface roughness of the dried coating is from 5 nm to 75 nm over a 5 micron by 5 micron area.

13. The coated article according to any of the preceding embodiments, wherein the coated article is glass.

14. The coated article according to any of the preceding embodiments, wherein the dry coating has an average thickness from 2 to 75 nm.

15. An antisoiling coating composition comprising an aqueous dispersion comprising:
 a first set of silica nanoparticles having an average diameter of less than 20 nm;
 a second set of silica nanoparticles having an average diameter of 20 nm to 120 nm; and
 a silane comprising at least one hydrolyzable group and at least one organic group bound to the silicon atom of the silane via a carbon atom,
  wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof.

16. The antisoiling coating composition according to embodiment 5, wherein the organic group in the silane is substituted with one or more hydroxy groups.

17. The antisoiling coating composition according to embodiment 5, wherein the organic group in the silane is substituted with one or more groups comprising —(CHRCH$_2$O)$_n$-units, wherein n is an integer from 1 to 50 and R is a monofunctional group independently selected for each unit.

18. The antisoiling coating composition according to embodiment 5, wherein the organic group in the silane is substituted with one or more anionic groups or the conjugate acids thereof.

19. The antisoiling coating composition according to embodiment 5, wherein the organic group in the silane is substituted with one or more cationic groups or the conjugate bases thereof.

20. The antisoiling coating composition according to any of the preceding embodiments directed to an antisoiling coating composition, further comprising an acid with pKa value of less than or equal to 3.5.

21. The antisoiling coating composition according to any of the preceding embodiments directed to an antisoiling coating composition, wherein the pH of the composition is less than 5.0.

22. The antisoiling coating composition according to any of the preceding embodiments directed to an antisoiling coating composition, wherein the pH of the composition is less than 4.0.

23. The antisoiling coating composition according to any of the preceding embodiments directed to an antisoiling coating composition, wherein the first set of silica nanoparticles has an average diameter of less than 15 nm.

24. The antisoiling coating composition according to any of the preceding embodiments directed to an antisoiling coating composition, wherein the first set of silica nanoparticles has an average diameter of less than 10 nm.

25. The antisoiling coating composition according to any of the preceding embodiments directed to an antisoiling coating composition, wherein the second set of silica nanoparticles has an average diameter of 20 nm to 80 nm.

26. The antisoiling coating composition according to any of the preceding embodiments directed to an antisoiling coating composition, wherein the second set of silica nanoparticles has an average diameter of 40 nm to 75 nm.

27. The antisoiling coating composition according to any of the preceding embodiments directed to an antisoiling coating composition, wherein the composition comprises from 0.25% to 5% by weight of the first set of silica nanoparticles, from about 0.25% to about 5% by weight of the second set of silica nanoparticles, and from about 0.1% to 5% by weight of the silane; wherein the weight percent is measured with respect to the total weight of the composition.

28. The antisoiling coating composition according to any of the preceding embodiments directed to an antisoiling coating composition, wherein the composition contains essentially no oxidizing components.

29. The antisoiling coating composition according to any of the preceding embodiments directed to an antisoiling coating composition, wherein the coating composition contains essentially no detergents, surfactants, leveling agents, colorants, dyes, perfumes, binders, materials that can act as oxidizers, materials that can act as oxidative catalysts, or materials that can act as oxidative photocatalysts.

30. The antisoiling coating composition according to any of the preceding embodiments directed to an antisoiling coating composition, wherein the at least one hydrolizable group in the silane is chosen from alkoxy and hydroxy groups.

31. The antisoiling coating composition according to any of the preceding embodiments directed to an antisoiling coating composition, wherein the silane is chosen from 3-(trihydroxysilyl)-1-propane sulfonic acid, octadecyldimethyl(3-trimethoxysilylpropyl)ammonium chloride, tetradecyldimethyl(3-trimethoxysilylpropyl)ammonium chloride, N-trimethoxysilylpropyl-N,N,N-trimethyl ammonium chloride, N-(3-triethoxysilylpropyl)gluconamide, N-(triethoxysilylpropyl)-O-polyethylene oxide urethane (containing from 4 to 6 —CH$_2$CH$_2$O— units), N-(trimethoxysilylpropyl)-N,N-dimethyl-N-(propyl sulfonic acid)ammonium chloride, [N-(trimethoxysilylpropyl)ethylenediamine, triacetic acid] trisodium salt, (3-trimethoxysilylpropyl)diethylenetriamine, trihydroxysilylpropylmethylphosphonate sodium salt, carboxyethylsilanetriol sodium salt, (trimethoxysilylpropyl)isothiouronium chloride, and 3-trihydroxysilylpropylmethyl phosphonate sodium salt 32. The antisoiling coating composition according to any of the preceding embodiments directed to an antisoiling coating composition, wherein the ratio of the first set of silica nanoparticles to the second set of silica nanoparticles is from 0.2:99.8 to 99.8:0.2.

33. The antisoiling coating composition according to any of the preceding embodiments directed to an antisoiling coating composition, wherein the nanoparticles are nominally spherical.

34. A method of forming a coating on a glass substrate, comprising:
applying an aqueous coating composition to the glass substrate;
wherein the applied coating composition has a thickness of greater than 4 microns;
wherein the aqueous coating composition comprises an aqueous dispersion comprising:
a first set of silica nanoparticles having an average diameter of less than 20 nm;
a second set of silica nanoparticles having an average diameter of 20 nm to 120 nm; and
a silane comprising at least one hydrolyzable group and at least one organic group bound to the silicon atom of the silane via a carbon atom,
wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof;
reducing the thickness of the coating composition to about 0.25 to 4 microns, and evaporating at least some of the water.

35. The method according to embodiment 11, wherein the organic group in the silane is substituted with one or more hydroxy groups.

36. The method according to embodiment 11, wherein the organic group in the silane is substituted with one or more groups comprising —(CHRCH$_2$O)$_n$— units, wherein n is an integer from 1 to 50 and R is a monofunctional group independently selected for each unit.

37. The method according to embodiment 11, wherein the organic group in the silane is substituted with one or more anionic groups or the conjugate acids thereof.

38. The method according to embodiment 11, wherein the organic group in the silane is substituted with one or more cationic groups or the conjugate bases thereof.

39. The method according to any of the preceding embodiments directed to a method, wherein the first set of silica nanoparticles in the aqueous coating composition has an average diameter of less than 15 nm.

40. The method according to any of the preceding embodiments directed to a method, wherein the first set of silica nanoparticles in the aqueous coating composition has an average diameter of less than 10 nm.
41. The method according to any of the preceding embodiments directed to a method, wherein the second set of silica nanoparticles in the aqueous coating composition has an average diameter of 20 nm to 80 nm.
42. The method according to any of the preceding embodiments directed to a method, wherein the second set of silica nanoparticles in the aqueous coating composition has an average diameter of 40 nm to 75 nm.
43. The method according to any of the preceding embodiments directed to a method, wherein the at least one hydrolizable group in the silane is chosen from alkoxy and hydroxy groups.
44. The method according to any of the preceding embodiments directed to a method, wherein the aqueous coating composition further comprises an acid with pKa value of less than or equal to 3.5.
45. The method according to any of the preceding embodiments directed to a method, wherein the pH of the aqueous coating composition is less than 5.0.
46. The method according to any of the preceding embodiments directed to a method, wherein the aqueous coating composition comprises from 0.25% to 5% by weight of the first set of silica nanoparticles, from about 0.25% to about 5% by weight of the second set of silica nanoparticles, and from about 0.1% to 5% by weight of the silane; wherein the weight percent is measured with respect to the total weight of the composition.
47. The method according to any of the preceding embodiments directed to a method, wherein the silane in the aqueous coating composition is chosen from 3-(trihydroxysilyl)-1-propane sulfonic acid, octadecyldimethyl(3-trimethoxysilylpropyl)ammonium chloride, tetradecyldimethyl(3-trimethoxysilylpropyl)ammonium chloride, N-trimethoxysilylpropyl-N,N,N-trimethyl ammonium chloride, N-(3-triethoxysilylpropyl)gluconamide, N-(triethoxysilylpropyl)-O-polyethylene oxide urethane (containing from 4 to 6 —CH$_2$CH$_2$O— units), N-(trimethoxysilylpropyl)-N,N-dimethyl-N-(propyl sulfonic acid)ammonium chloride, [N-(trimethoxysilylpropyl)ethylenediamine, triacetic acid] trisodium salt, (3-trimethoxysilylpropyl)diethylenetriamine, trihydroxysilylpropylmethylphosphonate sodium salt, carboxyethylsilanetriol sodium salt, (trimethoxysilylpropyl)isothiouronium chloride, and 3-trihydroxysilylpropylmethyl phosphonate sodium salt.
48. A coated article comprising a dried coating consisting essentially of:
a first set of silica nanoparticles having an average diameter of less than 20 nm;
a second set of silica nanoparticles having an average diameter of 20 nm to 120 nm; and
a silane comprising at least one organic group bound to the silicon atom of the silane via a carbon atom,
wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof;
wherein the average surface roughness of the dried coating is from 5 nm to 100 nm over a 5 micron by 5 micron area.
49. An antisoiling coating composition comprising an aqueous dispersion consisting essentially of:
water;
a first set of silica nanoparticles having an average diameter of less than 20 nm;
a second set of silica nanoparticles having an average diameter of 20 nm to 120 nm; and
a silane comprising at least one hydrolyzable group and at least one organic group bound to the silicon atom of the silane via a carbon atom,
wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof.
50. A method of forming a coating on a glass substrate, comprising:
applying an aqueous coating composition to the glass substrate;
wherein the applied coating composition has a thickness of greater than 4 microns;
wherein the aqueous coating composition comprises an aqueous dispersion consisting essentially of:
water;
a first set of silica nanoparticles having an average diameter of less than 20 nm;
a second set of silica nanoparticles having an average diameter of 20 nm to 120 nm; and
a silane comprising at least one hydrolyzable group and at least one organic group bound to the silicon atom of the silane via a carbon atom,
wherein the organic group is substituted with one or more groups chosen from: (a) hydroxy groups, (b) groups comprising —(CHRCH$_2$O)$_n$— units, wherein n is an integer from 1 to 50 and R is a monofunctional group independently selected for each unit, (c) anionic groups or the conjugate acids thereof, (d) cationic groups or the conjugate bases thereof, and (e) combinations thereof;
reducing the thickness of the coating composition to about 0.25 to 4 microns; and; evaporating at least some of the water.

Examples

Materials:
Nanoparticles
Spherical silica nanoparticle dispersions used are commercially available from the Nalco Company, an Ecolab Company, Naperville, Ill. under the trade designations: "NALCO 1115" (4 nm particles, supplied as about 16% by weight in water) and "NALCO DVSZN004" (42 nm particles, supplied as about 41% by weight in water).
Other Additives
Nitric acid was 67-70% Nitric acid, supplied by VWR International, Catalog Number BDH 3209-1 (VWR International, West Chester Pa.). It was diluted to 10% nitric acid by mixing water (900 g) and 67-70% nitric acid (154 g).
Silanes were supplied by Gelest, Inc., Morrisville Pa., under the trade designations and chemical names shown in Table 1.

TABLE 1

Gelest silanes.

| Gelest Catalog Number | Chemical name |
|---|---|
| SIT 8378.3 | 3-(trihydroxysilyl)-1-propane sulfonic acid, 30-35% in water as supplied |
| SI006620.0 | Octadecyldimethyl(3-trimethoxysilylpropyl)ammonium chloride, 60% in methanol as supplied |
| SIT8415.0 | N-trimethoxysilylpropyl-N,N,N-trimethyl ammonium chloride, 50% in methanol as supplied |
| SIT 8189.0 | N-(3-triethoxysilylpropyl)gluconamide, 50% in ethanol as supplied |
| SIT 8192.0 | N-(Triethoxysilylpropyl)-O-Polyethylene Oxide Urethane, 95% as supplied |

N-(trimethoxysilylpropyl)-N,N-dimethyl-N-(propyl sulfonic acid)ammonium chloride was prepared according to the methods in US 2013/273000.

All water used in these examples is either deionized water or distilled water, except as indicated.

Substrates

The clear glass used as a substrate was soda-lime "regular" glass. 3.2 mm thick, as is commonly available for glazing applications (for example, from Brin Northwestern Glass Company, Minneapolis Minn.). In some cases as indicated, Starphire™ low-iron glass, 3.2 mm thick, supplied by PPG Industries, Cheswick Pa. These substrates are formed into flat sheets, often called "float glass," by floating a molten ribbon of glass onto a pool of molten tin, and one side of the glass sheet so produced has a higher content of tin than the other side. The side of the glass that had not been in contact with molten tin (sometimes referred to as "untinned") was used for the experiments unless otherwise indicated.

The mirrors used as substrates for coating and for control experiments were Guardian standard mirror, 3.2 mm thick (Guardian Industries, Auburn Hills Mich.).

Unless otherwise indicated, substrates were cleaned by gently scrubbing with a solution of Liquinox detergent (Alconox, Inc. White Plains N.Y.) and a paper towel, followed by thorough rinsing with either running tap water or running deionized or distilled water, followed by a final rinse with deionized or distilled water, then air-drying, prior to use.

Coating Method

Pieces of glass were cut to a size of about 10×15 cm. The side that had not been in contact with molten tin was used for the experiments. Samples were coated by submerging the lower half of the piece of glass into a polyethylene beaker containing the coating liquid, waiting for 30 seconds. The sample was withdrawn from the coating liquid over a period of 1-3 seconds and then a squeegee with a rubber blade was immediately (within 2-4 seconds) used to remove all but a very thin amount of coating liquid. Optionally, coating liquid was removed from the back side of the samples coated on clear glass substrates by wiping with laboratory paper wipes, to remove material that might interfere with measurement of % Transmission in subsequent tests. The samples were then allowed to air dry under ambient conditions. Alternatively, the glass was placed in a horizontal position with the untinned side up, coating liquid was applied in excess using a pipette to produce a thick liquid layer and allowed to remain there for 30 seconds. Then excess coating liquid was removed with a squeegee and the samples were allowed to air dry. These coating methods were used interchangeably, as the coating that resulted was the same with either method.

In some samples, a substrate was coated with a coating liquid to produce a dried coating, and then a second application of a coating liquid was applied over the first dried coating, as shown in FIG. 2. The same procedures as above were used, that is application of coating liquid by submersion or application with a pipette over the first, dried coating on the substrate, a period of 30 seconds during which the coating liquid was maintained in contact with the substrate, removal of excess liquid with a squeegee, and air drying.

Test Methods:

Gloss

Gloss measurements were performed with a BYK micro-Tri-Gloss Meter, Cat. No. AG-4448 (BYK-Gardner USA, Columbia Md.) which measures gloss at angles of 20, 60 and 85 degrees. Unless otherwise noted, 3 measurements were made at the indicated angle on each sample, and the average of the 3 measurements is reported.

Transmission

% Transmission was measured for an area (optionally including a dry dirt spot) by placing the glass over the orifice of a BYK-Gardner haze-gard plus (available from BYK-Gardner USA, Columbia Md.), centering the soil spot (if any) in the center of the orifice and holding the sample firmly against the orifice by hand with the dry dirt spot on the side of the glass opposite the orifice (so it was not damaged by contact). The sample was removed, repositioned and % Transmission measurement was repeated two more times, for a total of three measurements.

Surface Roughness

Surface roughness was measured using Atomic Force Microscopy (AFM). AFM analyses were performed using a Dimension™ 3100 Atomic Force Microscope (supplied by Veeco Metrology Group. Tucson Ariz.) in tapping mode. Typical analysis conditions were as follows: The probes were 1 ohm silicon probes (OTESPA) with spring constants between 20 and 80 Newton/meter and resonance frequency approximately 310 kHz. Imaging parameters were about 68 to 780% of the set point, and the driving amplitude was about 40 to 60 mV. Gains were 04 to 0.6 for integral gain and 0.5 to 0.7 for proportional gain. Scan rate was about 1 Hz for 5 micron×5 micron area, with 512×512 data points collected. Data processing for topography used $1^{st}$ order XY plane fitting and zero order flattening and data processing for phase used zero order flattening. $R_q$ (Root-Mean-Square) roughness and average roughness for the 5 micron×5 micron area was calculated from this data.

Dry Dust Test

Pieces of substrate mirror to were cut to a size of about 10×15 cm and coated as indicated Samples (uncoated, partially coated or fully coated substrates, as indicated) were placed in racks that allowed good air circulation around the entire sample, and then placed in a controlled a humidity room at 15% relative humidity at about 21° C. The samples were allowed to equilibrate with the surroundings for at least 6 hr. Arizona Test Dust Fraction, Nominal 0-70 micron (Powder Technology, Inc., Burnsville, Minn.) was placed in shallow pans in the controlled humidity room and allowed to equilibrate with the surroundings for at least 6 hr.

Still in the controlled atmosphere, samples were placed, coating-side up, in a flat horizontal position. Gloss was measured at an angle of 20 degrees. A laboratory stainless steel "reagent digger" spatula, approx length 9 inch and width of open edge about 1 cm (available from Cole-Parmer, Vernon Hills Ill. as Product # WU-01019-13) was over-filled with the Arizona Test Dust, leveled off using a spatula, then carefully inverted onto the 15 cm edge of a sample. About 6-7 g of Arizona Test Dust was thus deposited on the edge of the sample, in a pile about 1 cm wide at the base.

The sample was then lifted from the edges with the dust pile at the top, and tilted to about a 45 degree angle to allow the dust to slide across and off the sample. The sample was then positioned vertically and tapped twice to remove any large clumps of dust that were not adhered. Once again, gloss was measured at 20 degrees. The dust was loosely adhered, and the base of the gloss meter could dislodge some dust or leave a visible "footprint," so multiple measurements were made only if the sample was large enough to permit multiple measurements of undisturbed areas.

Using single measurements or averages of multiple measurements on the same sample, "% Retention" was calculated according to the formula:

% Retention=(Final Gloss Measurement×100)/Initial Gloss Measurement

As the amount of dust on a sample increases, the gloss and measurement decreases. The dust was discarded after use with one sample, and fresh dust was used for the each sample tested.

Wet Drip Test

A functional test was specifically designed to measure the ability of water to remove concentrated or compacted soil without the use of mechanical action for force, and in the absence of as many other factors as possible, and is used to measure the effectiveness of the coatings and comparative coatings in the present disclosure. In addition to avoiding the use of mechanical force, this test was designed to that water is applied in a small amount and at a low velocity. The test method includes a method of reproducible formation of concentrated or compacted soil, without the formation of thick soil "cakes" and a quantitative measurement of the amount of soil that is directly related to optical performance.

Using Arizona Test Dust Fraction, Nominal 0-5 micron (Powder Technology, Inc., Burnsville, Minn.), a slurry was prepared with water at a concentration of 0.2% solids by placing 99.8 g water in a plastic container and adding 0.2 g ATD, and vigorously shaking to disperse the dust. The slurry was shaken from time to time during use and shaken vigorously if it had been stored for a length of time.

Flat, clear "float glass" was cut to pieces approximately 10×15 cm. Samples were prepared by coating all or a portion of the untinned side of the glass as indicated, and allowing the coating to air-dry.

Samples were placed on a flat, horizontal surface. About 70 microliter of 0.2% STD slurry was drawn into a 100 microliter syringe, and then the plunger was pushed to reduce the volume to 50 microliter. The tip of the syringe needle was touched to a lab tissue to remove excess slurry, and then the syringe was placed in a vertical position above the substrate with the needle tip touching the glass. The plunger was gently and slowly pressed to expel the 50 microliter of slurry in the syringe to form a drop of slurry on the sample. Usually, one drop was placed in each quadrant of the piece of glass, to provide multiple drops that were spaced sufficiently far apart for the subsequent steps of the test procedure. Sample were allowed to air-dry in a horizontal position, for several hours or overnight in a location free of strong air flow that might cause the drops to move. This produced a dry dirt spot that was easily visible although somewhat fragile and easily damaged by contact.

The diameter of the dry dirt spot was measured by placing the substrate over a ruler (so that the ruler was underneath the glass.) Then, % Transmission was measured for an area including the dry dirt spot by placing the glass over the orifice of a BYK-Gardner haze-gard plus, centering the soil spot in the center of the orifice and holding the sample firmly against the orifice by hand with the dry dirt spot on the side of the glass opposite the orifice (so it was not damaged by contact). The sample was removed, repositioned and the % Transmission measurement was repeated two more times, for a total of three measurements. Three additional measurements of % Transmission were made in areas of glass that were completely free of soil spots.

Next, a sample with a soil spot was positioned under a burette filled with 25 mL water. The substrate was positioned at a 45 degree angle. The burette tip was positioned about 1 cm above the soil spot, such that water drops impinged on the substrate slightly above the spot and then flowed down over it. The drip rate should was adjusted using the burette stopcock so that the 25 mL of water dripped above the sample over a period of 45 minutes (+/−15 minutes). For very large soil spots, it was acceptable to slightly reposition the burette throughout the 45 min so as to wet all portions of the dry dirt spot. When 25 mL of water had been applied to the dry dirt spot, the sample was allowed to air-dry at a 45 degree angle for several hours or overnight. % Transmission of an area including the dirt spot was again performed using the haze-gard plus as above, making three measurements with repositioning of the sample between each measurement.

Calculations were performed as follows. First, we calculated the average value for the three measurements on the dry dirt spot before water dripped onto it (X), the three measurements for bare glass without a dirt spot (Y), and the three measurements for the dirt spot after water dripped onto it (Z). Then we calculated "% Soil Removal" using these values:

X=Average of 3 measurements for dry dirt spot before dripping water
Y=Average of 3 measurements for bare glass
Z=Average of 3 measurements for dirt spot after dripping water % Soil Removal={1−[(Y−Z)/(Y−X)]}×100

Preparation of Coating Liquids

Coating liquids were prepared by charging a plastic (polyethylene, polypropylene or polystyrene) container with water, then other materials in the order indicated, with mixing after each addition. Unless indicated, there is no known effect of mixing order.

Comparative Example (CE) 1 (Liquid) was prepared by mixing 1554 g water, 164.1 g NALCO 1115, 25.54 g NALCO DVSZN004, and 20.81 g 10% nitric acid. Additional nitric acid, about 6.47 g, was added in small portions until pH 3.75 was reached. The total amount of nitric acid used was about 27.28 g; the exact amount needed to reach pH 3.75 will vary slightly as different lots of NALCO materials are used. For convenience, a large batch of Comparative Example 1 was prepared, and various silanes were added to it in the quantities shown in Table 2; these quantities are the amounts by weight of the "as supplied" silane. In Table 2 and subsequent tables, CE is used as an abbreviation for Comparative Example and EX is used as an abbreviation for Example The pH of the liquids after mixing was measured and is also shown in Table 2.

N-(trimethoxysilylpropyl)-N,N-dimethyl-N-(propyl sulfonic acid)ammonium chloride is referred to as "zwitterion" in Table 2, and was about 42% by weight as supplied.

TABLE 2

Coating Liquids

|  | CE1, g | Silane, g | pH |
|---|---|---|---|
| Ex 1 | SIT 8378.3 | 20.03 | 1.211 | 0.5 |
| Ex 2 | SIT 8378.3 | 19.99 | 0.29 | 1.0 |
| Ex 3 | SI006620.0 | 19.96 | 0.668 | 5.0 |
| Ex 4 | SI006620.0 | 20.01 | 0.23 | 4.5 |
| Ex 5 | SIT8415.0 | 19.98 | 0.802 | 4.0 |
| Ex 6 | SIT8415.0 | 20.05 | 0.203 | 4.0 |
| Ex 7 | SIT 8189 | 19.99 | 0.79 | 5.0 |
| Ex 8 | SIT 8189 | 19.99 | 0.224 | 5.0 |
| Ex 9 | Zwitterion | 20.02 | 0.992 | 4.5 |
| Ex 10 | Zwitterion | 19.99 | 0.244 | 4.0 |
| Ex 11 | SIT 8192.0 | 20.01 | 0.833 | 4.5 |
| Ex 12 | SIT 8192.0 | 20.00 | 0.23 | 5.0 |

Preparation of Coated Substrates

Comparative Example 101 (Coated Glass) was prepared by coating a clear glass substrate with Comparative Example 1 (Liquid).

Comparative Example 201 (Coated Mirror) was prepared by coating a mirror substrate with Comparative Example 1 (Liquid).

Each coating liquid in Table 2 was coated onto both a clear glass substrate (CG) and a mirror glass (MG) substrate. Additionally, each coating liquid in Table 2 was coated onto a clear glass substrate that had previously been coated with Comparative Example 1 (Liquid)(CG+1) and a mirror glass substrate that had previously been coated with Comparative Example 1 (Liquid) (MG+1). The Comparative Examples and Examples are shown in Table 3. In Table 3, "Sub" is used as an abbreviation for substrate.

TABLE 3

Coated Substrates

| Coating Liquid | Sub | Sample | Sub | Sample | Sub | Sample | Sub | Sample |
|---|---|---|---|---|---|---|---|---|
| Ex 1 | CG | 101 | MG | 201 | CG + 1 | 301 | MG + 1 | 401 |
| Ex 2 | CG | 102 | MG | 202 | CG + 1 | 302 | MG + 1 | 402 |
| Ex 3 | CG | 103 | MG | 203 | CG + 1 | 303 | MG + 1 | 403 |
| Ex 4 | CG | 104 | MG | 404 | CG + 1 | 304 | MG + 1 | 404 |
| Ex 5 | CG | 105 | MG | 205 | CG + 1 | 305 | MG + 1 | 405 |
| Ex 6 | CG | 106 | MG | 206 | CG + 1 | 306 | MG + 1 | 406 |
| Ex 7 | CG | 107 | MG | 207 | CG + 1 | 307 | MG + 1 | 407 |
| Ex 8 | CG | 108 | MG | 208 | CG + 1 | 308 | MG + 1 | 408 |
| Ex 9 | CG | 109 | MG | 209 | CG + 1 | 309 | MG + 1 | 409 |
| Ex 10 | CG | 110 | MG | 210 | CG + 1 | 310 | MG + 1 | 410 |
| Ex 11 | CG | 111 | MG | 211 | CG + 1 | 311 | MG + 1 | 411 |
| Ex 12 | CG | 112 | MG | 212 | CG + 1 | 312 | MG + 1 | 412 |

Test Results

Each of the Examples and Comparative Examples in Table 3 and additional Comparative Examples were tested using the Dry Dust Test and the Wet Drip Test. For comparison, note the performance of bare glass (Comparative) and a coating that contains nanoparticles but no silane (Comparatives CE101 and CE 201) Results are shown in Table 4.

TABLE 4

Test results

| Liquid | Samp # (BG) | Wet Drip Test | Samp # (MG) | Dry Dust Test | Samp# (GB + 1) | Wet Drip Test | Samp # (MG + 1) | Dry Dust Test |
|---|---|---|---|---|---|---|---|---|
| Ex 1 | 101 | 22 | 201 | 97 | 301 | 26 | 401 | 99 |
| Ex 2 | 102 | 18 | 202 | 99 | 302 | 20 | 402 | 99 |
| Ex 3 | 103 | 3 | 203 | 16 | 303 | 8 | 403 | 34 |
| Ex 4 | 104 | 36 | 204 | 56 | 304 | 18 | 404 | 98 |
| Ex 5 | 105 | 22 | 205 | 49 | 305 | 34 | 405 | 91 |
| Ex 6 | 106 | 41 | 206 | 93 | 306 | 33 | 406 | 95 |
| Ex 7 | 107 | 14 | 207 | 58 | 307 | 34 | 407 | 62 |
| Ex 8 | 108 | 40 | 208 | 96 | 308 | 23 | 408 | 96 |
| Ex 9 | 109 | 59 | 209 | 46 | 309 | 44 | 409 | 74 |
| Ex 10 | 110 | 24 | 210 | 51 | 310 | 36 | 410 | 93 |
| Ex 11 | 111 | 18 | 211 | 65 | 311 | 13 | 411 | 88 |
| Ex 12 | 112 | 48 | 212 | 98 | 312 | 26 | 412 | 99 |
| CE 1 | CE 101 | 6 | CE 201 | 99 | | | | |
| Bare Glass | | 6 | | 52 | | | | |

We claim:

1. A coated article comprising a dried coating comprising:
    a first set of silica nanoparticles having an average diameter of less than 20 nm;
    a second set of silica nanoparticles having an average diameter of 20 nm to 120 nm; and
    a silane comprising at least one organic group bound to the silicon atom of the silane via a carbon atom,
    wherein the organic group is substituted with both at least one (a) anionic group or the conjugate acid thereof, and at least one (b) cationic group or the conjugate base thereof,
    wherein the dried coating has essentially no binders,
    wherein the dried coating is hydrophilic, and
    wherein the average surface roughness of the dried coating is from 5 nm to 100 nm over a 5 micron by 5 micron area.

2. The coated article according to claim 1, wherein the first set of silica nanoparticles has an average diameter of less than 10 nm.

3. The coated article according to claim 1, wherein the second set of silica nanoparticles has an average diameter of 40 nm to 75 nm.

4. The coated article according to claim 1, wherein the average surface roughness of the dried coating is from 5 nm to 75 nm over a 5 micron by 5 micron area.

5. An antisoiling coating composition comprising an aqueous dispersion comprising:
   a first set of silica nanoparticles having an average diameter of less than 20 nm;
   a second set of silica nanoparticles having an average diameter of 20 nm to 120 nm; and
   a silane comprising at least one hydrolyzable group and at least one organic group bound to the silicon atom of the silane via a carbon atom,
      wherein the organic group is substituted with both at least one (a) anionic group or the conjugate acid thereof, and at least one (b) cationic group or the conjugate base thereof,
      wherein the coating composition has essentially no binders, and
   wherein a coating derived from the coating composition is hydrophilic.

6. The antisoiling coating composition according to claim 5, further comprising an acid with pKa value of less than or equal to 3.5.

7. The antisoiling coating composition according to claim 5, wherein the pH of the composition is less than 4.0.

8. The antisoiling coating composition according to claim 5, wherein the first set of silica nanoparticles has an average diameter of less than 10 nm.

9. The antisoiling coating composition according to claim 5, wherein the second set of silica nanoparticles has an average diameter of 40 nm to 75 nm.

10. The antisoiling coating composition according to claim 5, wherein the composition comprises from 0.25% to 5% by weight of the first set of silica nanoparticles, from about 0.25% to about 5% by weight of the second set of silica nanoparticles, and from about 0.1% to 5% by weight of the silane; wherein the weight percent is measured with respect to the total weight of the composition.

11. A method of forming a coating on a glass substrate, comprising:
   applying an aqueous coating composition to the glass substrate;
      wherein the applied coating composition has a thickness of greater than 4 microns;
      wherein the aqueous coating composition comprises an aqueous dispersion comprising:
         a first set of silica nanoparticles having an average diameter of less than 20 nm;
         a second set of silica nanoparticles having an average diameter of 20 nm to 120 nm; and
         a silane comprising at least one hydrolyzable group and at least one organic group bound to the silicon atom of the silane via a carbon atom,
            wherein the organic group is substituted with both at least one (a) anionic group or the conjugate acid thereof, and at least one (b) cationic group or the conjugate base thereof:
            wherein the coating composition has essentially no binders;
   reducing the thickness of the coating composition to about 0.25 to 4 microns, and
   evaporating at least some of the water, and
   wherein the coating on the glass substrate is hydrophilic.

12. The method according to claim 11, wherein the first set of silica nanoparticles in the aqueous coating composition has an average diameter of less than 10 nm.

13. The method according to claim 11, wherein the second set of silica nanoparticles in the aqueous coating composition has an average diameter of 40 nm to 75 nm.

14. The method according to claim 11, wherein the pH of the aqueous coating composition is less than 5.0.

15. The method according to claim 11, wherein the aqueous coating composition comprises from 0.25% to 5% by weight of the first set of silica nanoparticles, from about 0.25% to about 5% by weight of the second set of silica nanoparticles, and from about 0.1% to 5% by weight of the silane; wherein the weight percent is measured with respect to the total weight of the composition.

* * * * *

UNITED STATES PATENT AND TRADEMARK OFFICE
CERTIFICATE OF CORRECTION

PATENT NO. : 10,336,650 B2
APPLICATION NO. : 15/114818
DATED : July 2, 2019
INVENTOR(S) : Katherine Brown et al.

Page 1 of 2

It is certified that error appears in the above-identified patent and that said Letters Patent is hereby corrected as shown below:

In the Specification

Column 1
Line 10, Delete "2," and insert -- 4, --, therefor.

Column 5
Line 24, Delete "that that" and insert -- that --, therefor.

Column 6
Line 25, Delete "nanopoarticles")," and insert -- nanoparticles), --, therefor.
Line 42, Delete "atom" and insert -- atom. --, therefor.

Column 7
Line 15, Delete "(CHRCH2O)n—,"  and insert -- —(CHRCH2O)n—, --, therefor.
Line 44, Delete "potassion" and insert -- potassium --, therefor.

Column 8
Line 34, Delete "(Toyko," and insert -- (Tokyo, --, therefor.

Column 10
Line 33-34, Delete "superhydrophylic." and insert -- superhydrophilic. --, therefor.

Column 11
Line 4, Delete "composition," and insert -- composition. --, therefor.

Column 12
Line 8, Delete "silane" and insert -- silane. --, therefor.

Column 13
Line 26, Delete "nanopaticles" and insert -- nanoparticles --, therefor.

Signed and Sealed this
Fifth Day of May, 2020

Andrei Iancu
*Director of the United States Patent and Trademark Office*

CERTIFICATE OF CORRECTION (continued)
U.S. Pat. No. 10,336,650 B2

Column 15
Line 47, Delete "thereof." and insert -- thereof, --, therefor.

Column 16
Line 11, Delete "hydrolizable" and insert -- hydrolyzable --, therefor.

Column 17
Line 60, Delete "hydrolizable" and insert -- hydrolyzable --, therefor.

Column 18
Line 14, Delete "salt" and insert -- salt. --, therefor.

Column 19
Line 15, Delete "hydrolizable" and insert -- hydrolyzable --, therefor.

Column 24
Line 43, Delete "={1–[Y–Z)/" and insert -- ={1–[(Y–Z)/ --, therefor.